(12) United States Patent
Mellott et al.

(10) Patent No.: US 10,855,013 B2
(45) Date of Patent: *Dec. 1, 2020

(54) CABLE ASSEMBLY WITH STRAIN RELIEF

(71) Applicant: Aptiv Technologies Limited, St. Michael (BB)

(72) Inventors: Michael L. Mellott, Youngstown, OH (US); Glenn E. Robison, Youngstown, OH (US); Jannik Renfordt, Solingen (DE)

(73) Assignee: APTIV TECHNOLOGIES LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 16/711,907

(22) Filed: Dec. 12, 2019

(65) Prior Publication Data

US 2020/0119480 A1 Apr. 16, 2020

Related U.S. Application Data

(63) Continuation of application No. 15/867,277, filed on Jan. 18, 2018, now Pat. No. 10,573,988.
(Continued)

(51) Int. Cl.
*H01R 13/62* (2006.01)
*H01R 13/58* (2006.01)
(Continued)

(52) U.S. Cl.
CPC ......... *H01R 13/187* (2013.01); *H01R 13/052* (2013.01); *H01R 13/113* (2013.01);
(Continued)

(58) Field of Classification Search
CPC .. H01R 13/506; H01R 13/516; H01R 13/595; H01R 13/658; H01R 13/518;
(Continued)

(56) References Cited

U.S. PATENT DOCUMENTS 6,234,834 B1   5/2001   Tsai et al.
7,632,148 B1  12/2009   Kawamura et al.
(Continued)

FOREIGN PATENT DOCUMENTS

CA      2199276 A1     3/1996
CN    101536270 A      9/2009
(Continued)

*Primary Examiner* — Edwin A. Leon
*Assistant Examiner* — Milagros Jeancharles
(74) *Attorney, Agent, or Firm* — Billion & Armitage; Michael Collins

(57) ABSTRACT

A cable assembly includes a cable, a connector-body, a cable-seal, and a retainer. The connector-body is attached to the cable. The cable-seal is disposed within the connector-body and surrounds the cable. The cable-seal is configured to inhibit entry of a contaminant into the connector-body. The retainer is in direct contact with the cable, the connector-body and the cable-seal. The retainer is configured to retain the cable-seal within the connector-body. The retainer is configured to be installed onto the cable and is attached to the connector-body. The retainer contains cable-clamps mounted to a pair of opposed inclined-surfaces located on an inner-surface of the retainer. The cable-clamps include inclined-ramps configured to engage the inclined-surfaces. The inclined-ramps move along the inclined-surfaces, thereby causing the cable-clamps to impart a radial-force normal to the cable when the retainer is attached to the connector-body.

16 Claims, 6 Drawing Sheets

Related U.S. Application Data

(60) Provisional application No. 62/539,656, filed on Aug. 1, 2017.

(51) Int. Cl.
  *H01R 13/187* (2006.01)
  *H01R 13/193* (2006.01)
  *H01R 13/44* (2006.01)
  *H01R 13/621* (2006.01)
  *H01R 13/26* (2006.01)
  *H01R 13/502* (2006.01)
  *H01R 13/52* (2006.01)
  *H01R 13/66* (2006.01)
  *H01R 13/05* (2006.01)
  *H01R 13/11* (2006.01)
  *H01R 13/28* (2006.01)
  *H01R 13/53* (2006.01)
  *H01R 24/66* (2011.01)
  *H01R 43/16* (2006.01)
  *H01R 13/207* (2006.01)
  *H01R 4/50* (2006.01)
  *H01R 13/633* (2006.01)

(52) U.S. Cl.
  CPC ............ *H01R 13/193* (2013.01); *H01R 13/26* (2013.01); *H01R 13/28* (2013.01); *H01R 13/44* (2013.01); *H01R 13/502* (2013.01); *H01R 13/5202* (2013.01); *H01R 13/5208* (2013.01); *H01R 13/5219* (2013.01); *H01R 13/53* (2013.01); *H01R 13/5812* (2013.01); *H01R 13/62* (2013.01); *H01R 13/6215* (2013.01); *H01R 13/665* (2013.01); *H01R 24/66* (2013.01); *H01R 43/16* (2013.01); *H01R 4/5091* (2013.01); *H01R 13/207* (2013.01); *H01R 13/6335* (2013.01); *H01R 13/6683* (2013.01); *H01R 2201/26* (2013.01)

(58) Field of Classification Search
  CPC ............ H01R 13/5202; H01R 13/5208; H01R 13/58; H01R 13/582; H01R 13/5825; H01R 13/5804; H01R 13/5205; H01R 13/585; H01R 13/502; H01R 13/5025; H01R 13/504; H01R 13/5045; H02G 3/08; H02G 3/083; H02G 3/088
  See application file for complete search history.

(56) References Cited

U.S. PATENT DOCUMENTS

| | | | |
|---|---|---|---|
| 9,825,445 B2 * | 11/2017 | Metzler | H01R 13/506 |
| 10,573,988 B2 * | 2/2020 | Mellott | H01R 13/44 |
| 2002/0025732 A1 | 2/2002 | Hsieh | |
| 2003/0194919 A1 | 10/2003 | Hsieh et al. | |
| 2004/0219840 A1 | 11/2004 | Wise | |
| 2009/0111323 A1 | 4/2009 | Burris et al. | |
| 2010/0248530 A1 | 9/2010 | Clark et al. | |
| 2011/0053404 A1 | 3/2011 | Tsuruta et al. | |
| 2011/0312211 A1 | 12/2011 | Natoli | |
| 2012/0037416 A1 | 2/2012 | Chiou | |
| 2012/0156947 A1 | 6/2012 | Tyler | |
| 2013/0267109 A1 | 10/2013 | Chawgo et al. | |
| 2015/0144395 A1 | 5/2015 | Tanaka | |
| 2017/0288337 A1 * | 10/2017 | Martino | H01R 13/5845 |

FOREIGN PATENT DOCUMENTS

| | | |
|---|---|---|
| CN | 201541002 U | 8/2010 |
| CN | 106299808 A | 1/2017 |
| EP | 557898 A1 | 9/1993 |
| EP | 982809 A2 | 3/2000 |
| EP | 2790273 A1 | 10/2014 |
| EP | 2816672 A1 | 12/2014 |
| JP | 10508418 A | 8/1998 |
| WO | 9306637 A1 | 4/1993 |
| WO | 2010068291 A1 | 6/2010 |

* cited by examiner

CABLE ASSEMBLY WITH STRAIN RELIEF

CROSS-REFERENCE TO RELATED APPLICATION

This is a continuation application and claims the benefit under 35 U.S.C. § 120 of U.S. patent application Ser. No. 15/867,277, filed Jan. 18, 2018, which claims the benefit under 35 U.S.C. § 119(e) of U.S. Provisional Patent Application No. 62/539,656, filed Aug. 1, 2017, the entire disclosure of each of which is hereby incorporated herein by reference.

TECHNICAL FIELD OF INVENTION

This disclosure generally relates to a cable assembly, and more particularly relates to a cable assembly that includes strain relief.

BRIEF DESCRIPTION OF DRAWINGS

The present invention will now be described, by way of example with reference to the accompanying drawings, in which.

DETAILED DESCRIPTION

Figure 1:
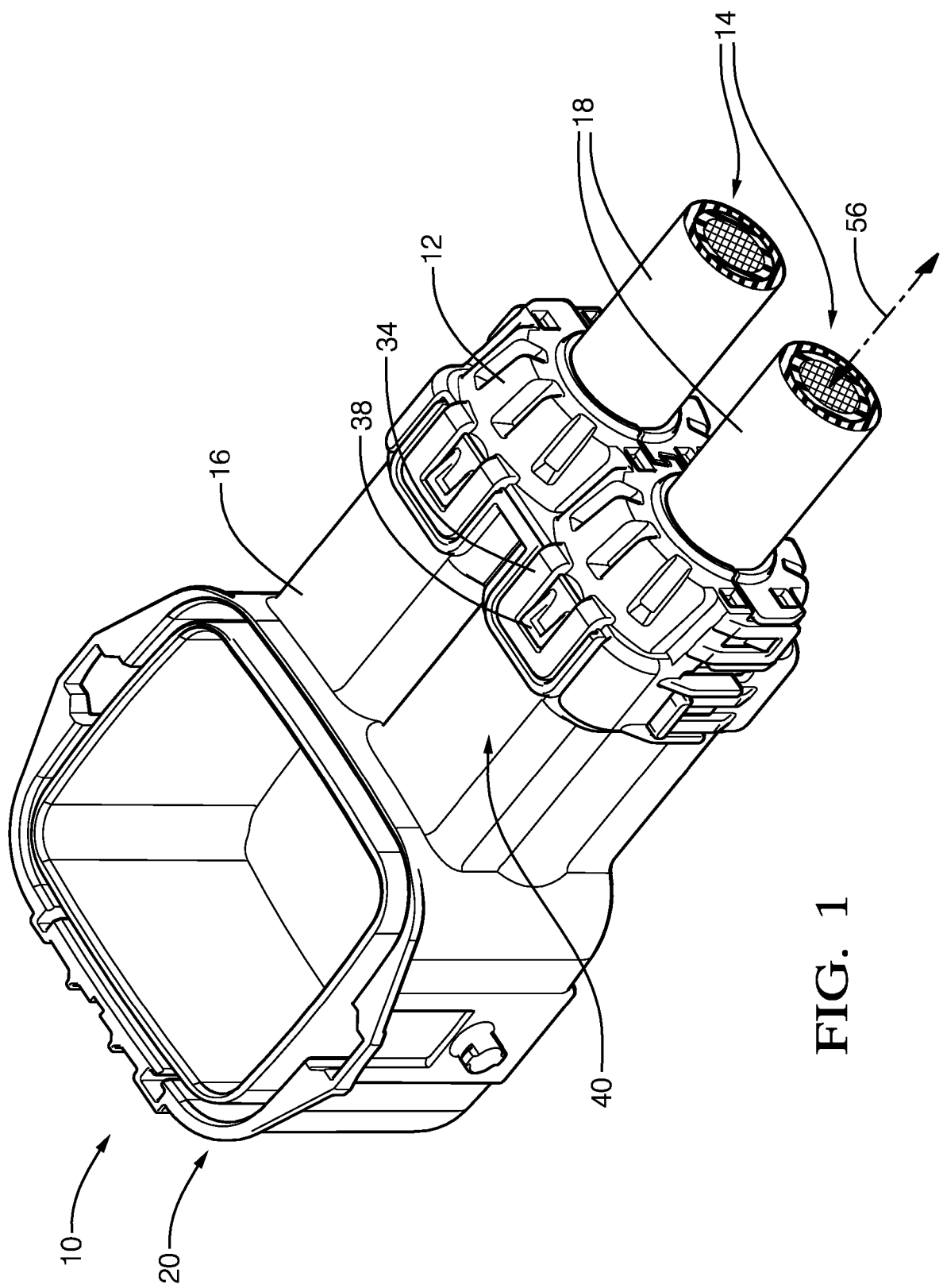
FIG. 1 is an illustration of a cable assembly in accordance with one embodiment.

FIG. 1 illustrates a non-limiting example of a cable assembly 10. The cable assembly 10 is an improvement over previous cable assemblies because the cable assembly 10 includes a two-piece retainer 12, configured to retain a cable-seal 13, that provides a cable 14 strain-relief. The cable assembly 10 provides the technical benefit of enabling the installation of the retainer 12 after the cable 14 is assembled into a connector-body 16, as will be described in more detail below.

The cable assembly 10 includes the cable 14. The cable 14 is a cable 14 suitable to conduct electrical-current or transmit electrical-signals in an electrical-system of an automobile. The cable 14 may be a solid cable 14, or may be a stranded cable 14. The cable 14 includes an outer-jacket 18 formed of a dielectric-material, such a flexible polymeric-material, that is capable of electrically isolating the electrical conductor from its surroundings. In an alternative embodiment, the cable 14 is an fiber-optic-cable capable of transmitting light-signals.

The cable assembly 10 also includes the connector-body 16 attached to the cable 14. The connector-body 16 may include electrical-terminals (not shown) disposed within a terminal-end 20 of the connector-body 16 that are attached to the cable 14 and configured to interconnect with corresponding electrical-terminals (not shown) of the electrical-system. The connector-body 16 is formed of any dielectric material capable of electrically isolating portions of the electrical-terminals, and is preferably a polyamide (NYLON) material.

The cable assembly 10 also includes the cable-seal 13 disposed within the connector-body 16 and surrounding the cable 14. The cable-seal 13 is configured to inhibit entry of a contaminant into the connector-body 16 (e.g. water, dust, etc.) and is formed of a flexible polymeric-material, such as a silicone-rubber. The cable 14 is inserted through a cylindrical through-opening formed in the cable-seal 13 and forms a seal between the cable 14 and the cable-seal 13. The cable-seal 13 also forms a seal between the connector-body 16 and the cable-seal 13.

The cable assembly 10 also includes the retainer 12 in direct contact with the cable 14, the connector-body 16 and the cable-seal 13. The retainer 12 is configured to retain the cable-seal 13 within the connector-body 16 and inhibit a movement of the cable-seal 13 that may be caused by vibrations and a routing of the cable 14.

The retainer 12 is further configured to be installed onto the cable 14, and has the added technical benefit of installation onto the cable 14 after the cable 14 is attached to the connector-body 16. This technical benefit removes the requirement of inserting the cable 14 through a one-piece-retainer prior to attaching any ferrules or electrical-terminals to the cable 14. The retainer 12 is further configured to attach to the connector-body 16, as will be described in more detail below.

Figure 2:
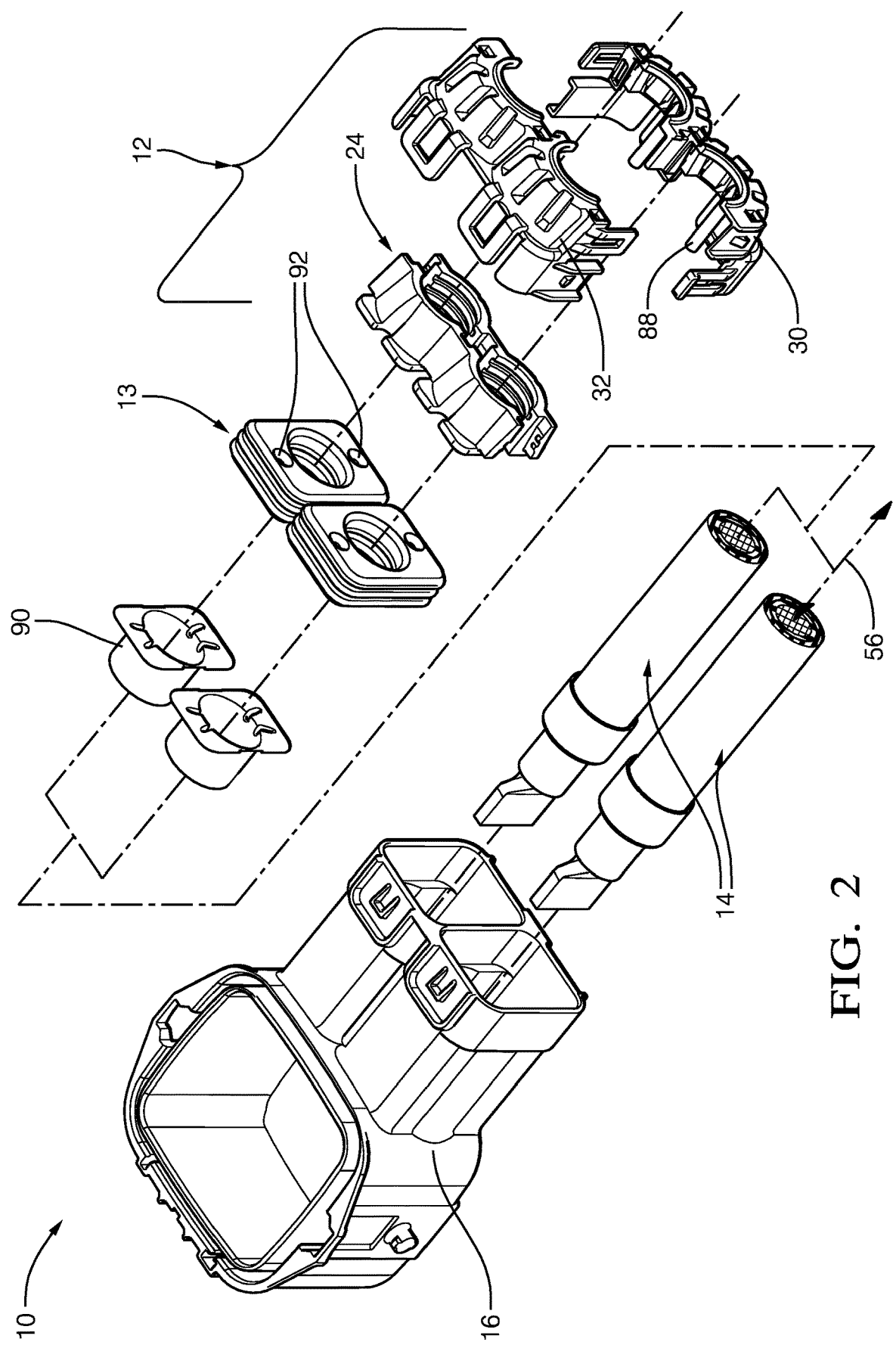
FIG. 2 is an exploded-view of the cable assembly of FIG. 1 in accordance with one embodiment.

FIG. 2 is an exploded view of the cable assembly 10 illustrating other components that may otherwise be hidden from view in FIG. 1.

Figure 3:
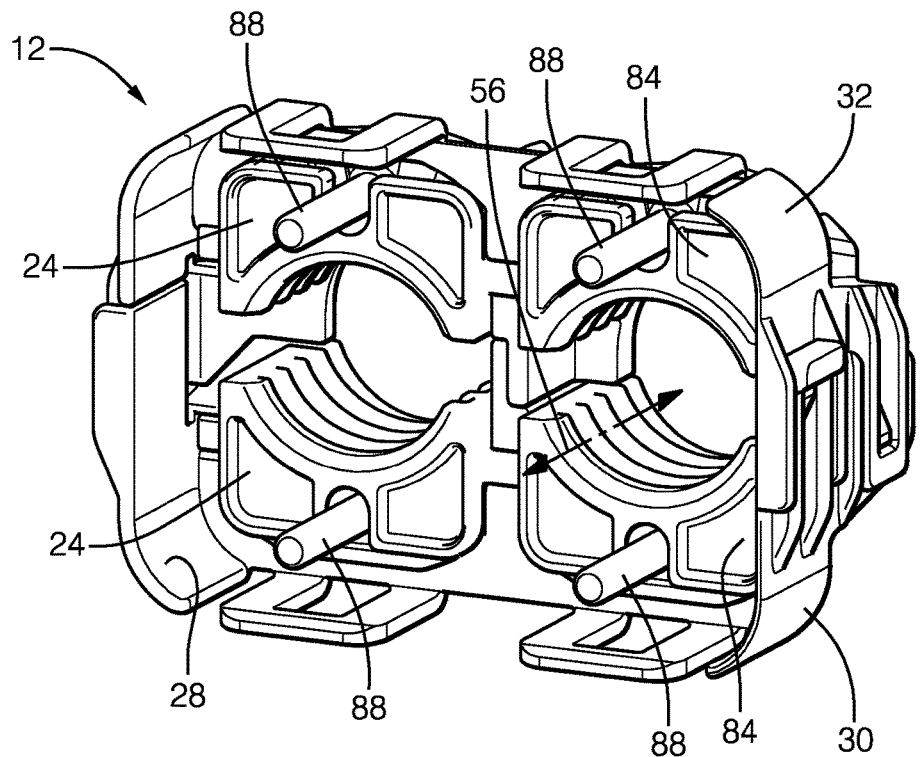
FIG. 3 is an illustration of a retainer of the cable assembly of FIG. 1 in accordance with one embodiment.

FIG. 3 illustrates a perspective view of the retainer 12 isolated from the cable assembly 10 of FIG. 1. The retainer 12 includes cable-clamps 24 that are longitudinally slideably mounted to a pair of opposed inclined-surfaces 26 (see FIG. 4) which are located on an inner-surface 28 of the retainer 12. The retainer 12 includes a first-half 30 and an opposed second-half 32 that is identical to the first-half 30. The first-half 30 is configured to mate with the second-half 32. The first-half 30 and the identical second-half 32 each contain the cable-clamps 24, which are illustrated in FIG. 3 as being configured to fit the pair of cables 14 after they are installed into the connector-body 16 of FIG. 1. The retainer 12 and cable-clamps 24 may be configured to be installed onto the connector-body 16 that includes a single cable 14, or may be configured to be installed onto the connector-body 16 that includes a plurality of cables 14.

Figure 4:
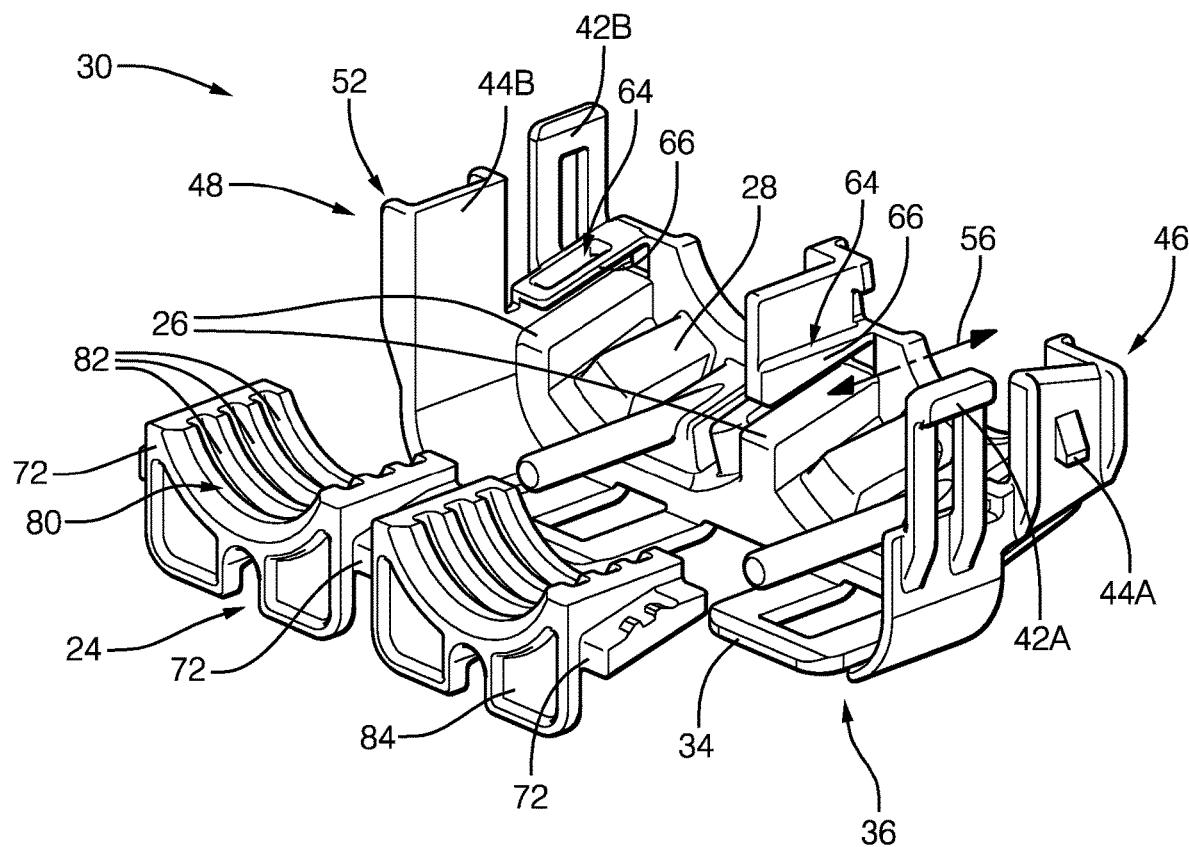
FIG. 4 is an illustration of a first-half of the retainer of FIG. 3 in accordance with one embodiment.

FIG. 4 is an exploded-view of the first-half 30 of the retainer 12 isolated from the second-half 32 of the retainer 12, and illustrates the cable-clamp 24 removed from the first-half 30 to more clearly view the inner-surface 28 of the retainer 12. Due to the identical nature of the first-half 30 and the second-half 32, only the first-half 30 will be described in detail, and the description of the first-half 30 will also apply to the second-half 32. The first-half 30 includes at least one first-locking-tab 34 on a bottom-side 36 that is configured to engage a first-locking-ramp 38 on an outer-surface 40 of the connector-body 16 (see FIG. 1). The first-half 30 also includes at least one second-locking-tab 42 and at least one second-locking-ramp 44 on both a first-side 46 (shown as 42A and 44A, respectively) and on a second-side 48 (shown as 42B and 44B, respectively) opposite the first-side 46 of the first-half 30. In the example illustrated in FIG. 4, the first-side 46 is characterized by the second-locking-tab 42A being located in a forward-position 52 on the first-half 30, and the second-side 48 is characterized by the second-locking-ramp 44B being located in the forward-position 52. Alternatively, the second-side 48 may be characterized by the second-locking-tab 42B being located in the forward-position 52 (not shown) and the first-side 46 may be characterized by the second-locking-ramp 44A being located in the forward-position 52 (not shown).

Figure 5:
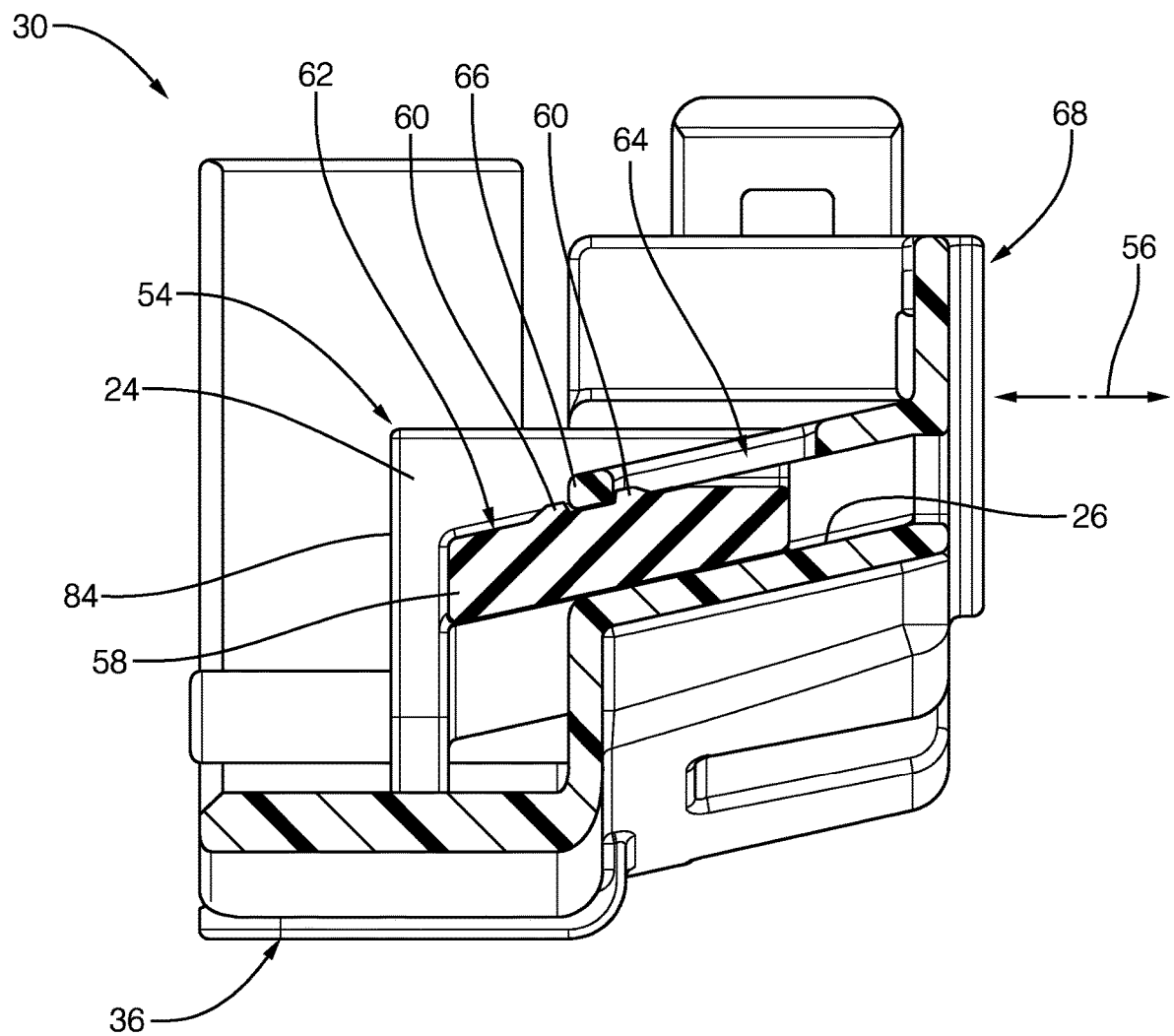
FIG. 5 is a side-view of the first-half of the retainer of FIG. 4 in accordance with one embodiment.

FIG. 5 is a cross-section view illustrating the first-half 30 with the cable-clamp 24 in a pre-stage position 54. The pair of opposed inclined-surfaces 26 are inclined relative to a longitudinal-axis 56 of the cable 14, as indicated by the dashed-line extending from the inclined-surface 26, and are oriented generally parallel to the inclined-surfaces 26. The cable-clamps 24 include inclined-ramps 58 configured to engage the inclined-surfaces 26. The cable-clamps 24 are releasably locked in the pre-stage position 54 by locking-features 60 that project from a top-surface 62 of the inclined-ramps 58. The locking-features 60 are disposed within apertures 64 defined by arms 66 overlaying the inclined-surfaces 26 that project from a back-side 68 of the retainer 12. The apertures 64 are further configured to retain the locking-features 60 when the cable-clamps 24 are moved from the pre-stage position 54 to a clamped-position 70, as will be described below.

Figure 6A:
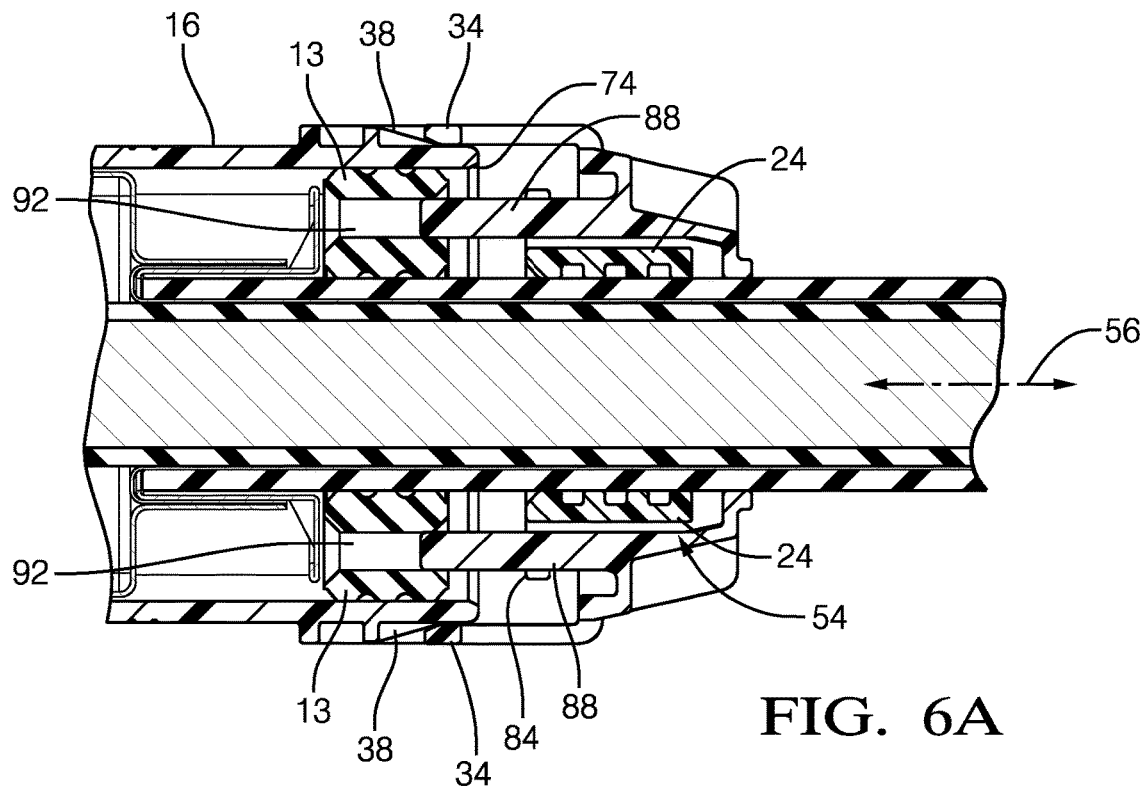
FIG. 6A is a cross-section view of a portion of the cable assembly of FIG. 1 illustrating cable-clamps in a pre-stage position in accordance with one embodiment.
Figure 6B:
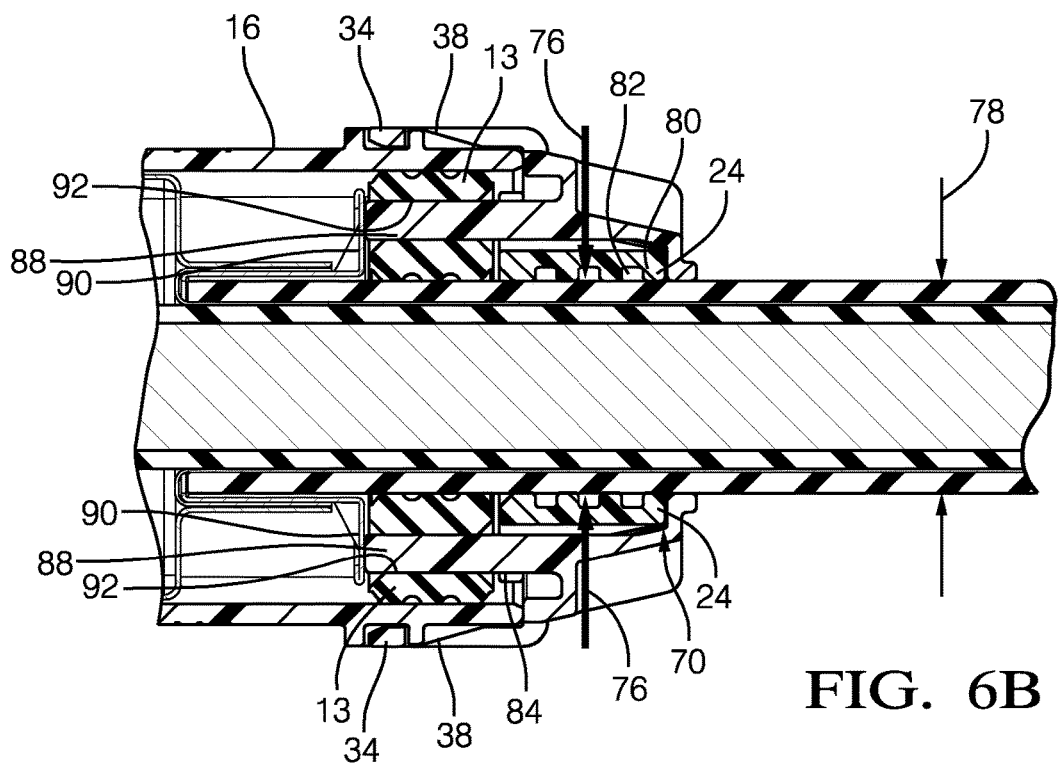
FIG. 6B is a cross-section view of the portion of the cable assembly of FIG. 6A illustrating the cable-clamps in a clamped-position in accordance with one embodiment.

FIGS. 6A-6B illustrate a progression of attaching the retainer 12 to the connector-body 16. The retainer 12 is configured to be moved along the cable 14 toward the connector-body 16 in the direction parallel to the longitudinal-axis 56. FIG. 6A illustrates the retainer 12 with the cable-clamps 24 in the pre-stage position 54 and the first-locking-tabs 34 on the retainer 12 are not yet engaged with the first-locking-ramps 38 on the connector-body 16. When the retainer 12 is attached to the connector-body 16 a leading-edge 72 (see FIG. 4) of the inclined-ramps 58 engage a trailing-edge 74 of the connector-body 16 and the cable-clamps 24 are moved from the pre-stage position 54, whereby the inclined-ramps 58 move along the inclined-surfaces 26 to the clamped-position 70 (see FIG. 6B), thereby causing the cable-clamps 24 to impart a radial-force 76 normal to the cable 14. The radial-force 76 inhibits movement of the cable 14 due to vibrations or other forces experienced by the cable 14, thus improving the reliability of the cable assembly 10. The cable-clamps 24 preferably engage the cable 14 for a length of between 75% to 85% of an outer-diameter 78 dimension of the cable 14.

Referring back to FIG. 4, the cable-clamps 24 define a contact-surface 80 in direct contact with the cable 14. The contact-surface 80 defines a plurality of grooves 82 extending below the contact-surface 80, whereby a portion of the outer-jacket 18 of the cable 14 is disposed within the plurality of grooves 82 when the cable-clamps 24 impart the radial-force 76, as illustrated in FIG. 6B.

Referring again to FIG. 4, the cable-clamps 24 further include a face 84 extending perpendicular to the longitudinal-axis 56 of the cable 14 that is configured to engage the cable-seal 13 when the retainer 12 is attached to the connector-body 16. The face 84 maintains a compressive-force on the cable-seal 13 that retains the cable-seal 13 in the designed position to inhibit contamination from entering the connector-body 16.

Figure 7A:
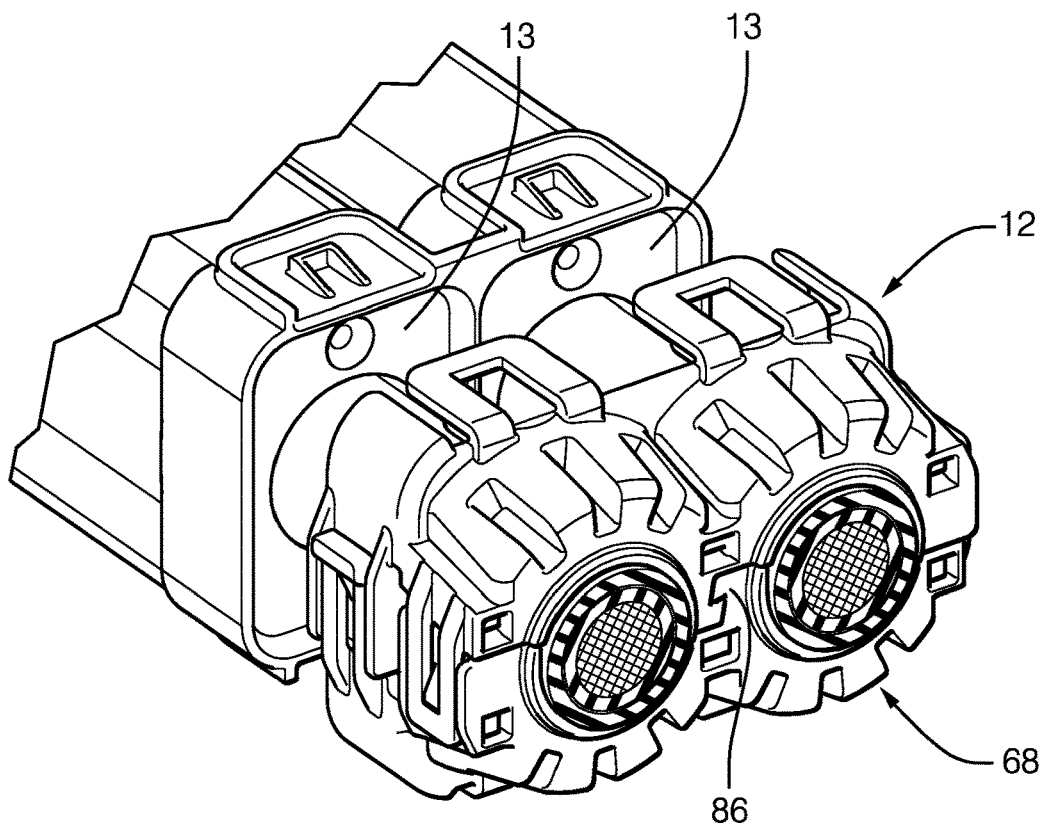
FIG. 7A is a perspective-view of a portion of the cable assembly of FIG. 1 illustrating the retainer attached to the cables in accordance with one embodiment.
Figure 7B:
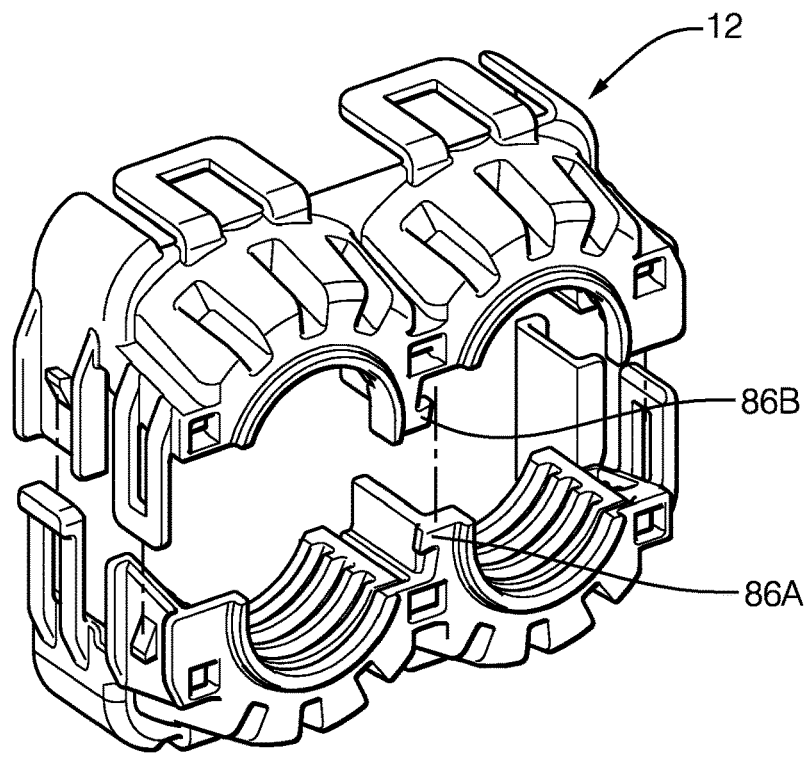
FIG. 7B is an exploded-view of the retainer isolated from the cable assembly of FIG. 7A in accordance with one embodiment.

FIG. 7A illustrates the back-side 68 of the retainer 12 that is assembled over a pair of cables 14. The retainer 12 further includes a clip-lock 86 disposed between the plurality of cables 14. FIG. 7B illustrates an exploded-view of the retainer 12 of FIG. 7A isolated from the cable assembly 10. The clip-lock 86 includes a first-clip 86A located on the first-half 30 of the retainer 12 and a corresponding second-clip 86B located on the opposed second-half 32 of the retainer 12. The first-clip 86A and the corresponding second-clip 86B are configured to engage one another when the retainer 12 is installed onto the cable 14 and enables the radial-force 76 to be consistently applied about the cable 14 where a plurality of cables 14 are present.

Referring again to FIG. 3, the retainer 12 may include a plurality of terminal position assurance posts 88 (TPA-posts 88) configured to engage an inner-ferrule 90 disposed within the connector-body 16 when the retainer 12 is attached to the connector-body 16, as illustrated in FIGS. 6A-6B. The plurality of TPA-posts 88 extend from the back-side 68 of the retainer 12 and are aligned parallel to the longitudinal-axis 56 of the cable 14. The plurality of TPA-posts 88 pass through passages 92 formed in the cable-seal 13 and contact the inner-ferrule 90 and apply an axial-force (not shown) to ensure the inner-ferrule 90 is properly seated.

Accordingly, a cable assembly 10 is provided. The cable assembly 10 is an improvement over other cable assemblies because the cable assembly 10 includes a two-piece retainer 12 with cable-clamps 24 that is configured to be installed onto the cable 14 after the cable 14 is assembled into the connector-body 16. The cable-clamps 24 provide strain relief for the cable 14, and especially for a large-diameter cable 14 (e.g. greater than 5 mm) typically used in high-voltage applications.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Furthermore, the use of the terms a, an, etc. do not denote a limitation of quantity, but rather denote the presence of at least one of the referenced items.

We claim:
1. A cable assembly, comprising:
a cable;
a connector-body attached to the cable;
a cable-seal disposed within the connector-body and surrounding the cable; and
a retainer in direct contact with the cable, the connector-body and the cable-seal, wherein the retainer is configured to retain the cable-seal within the connector-body and further configured to attach to the connector-body, wherein the retainer contains cable-clamps longitudinally and slideably mounted to a pair of opposed inclined-surfaces located on an inner-surface of the retainer and inclined relative to a longitudinal-axis of the cable, wherein the cable-clamps include inclined-ramps configured to engage the inclined-surfaces, and wherein the inclined-ramps move along the inclined-surfaces, thereby causing the cable-clamps to impart a radial-force normal to the cable when the retainer is attached to the connector-body, wherein the cable-clamps are moved from a pre-stage position to a clamped-position when the retainer is attached to the connector-body, and wherein the cable-clamps are releasably locked in the pre-stage position by locking-features that project from a top-surface of the inclined-ramps, the locking-features disposed within apertures defined by arms overlaying the inclined-surfaces, the arms project from a back-side of the retainer, the apertures configured to retain the locking-features when the cable-clamps are moved from the pre-stage position to the clamped-position.

2. The cable assembly in accordance with claim 1, wherein the retainer is configured to be moved along the cable.

3. The cable assembly in accordance with claim 1, wherein the inclined-ramps are oriented generally parallel to the inclined-surfaces.

4. The cable assembly in accordance with claim 1, wherein a leading-edge of the inclined-ramps engage a trailing-edge of the connector-body when the retainer is attached to the connector-body.

5. The cable assembly in accordance with claim 1, wherein the cable-clamps further include a face extending perpendicular to the longitudinal-axis of the cable and wherein the face is configured to engage the cable-seal when the retainer is attached to the connector-body.

6. The cable assembly in accordance with claim 1, wherein the retainer includes a first-half and a separate opposed second-half, wherein the first-half is configured to mate with the opposed second-half.

7. The cable assembly in accordance with claim 1, wherein the first-half and the opposed second-half include a first-locking-tab on a bottom-side, wherein the first-locking-tab is configured to engage a first-locking-ramp on an outer-surface of the connector-body.

8. The cable assembly in accordance with claim 1, wherein the first-half and the opposed second-half include a second-locking-tab and a second-locking-ramp on both a first-side and a second-side opposite the first side of an outer-surface of the first-half and opposing-second-half.

9. The cable assembly in accordance with claim 8, wherein the first-side is characterized by the second-locking-tab being located in a forward-position and the second-side is characterized by the second-locking-ramp being located in the forward-position.

10. The cable assembly in accordance with claim 8, wherein the second-side is characterized by the second-locking-tab being located in a forward-position and the first-side is characterized by the second-locking-ramp being located in the forward-position.

11. The cable assembly in accordance with claim 1, wherein the cable assembly further includes a plurality of cables and the retainer further includes a clip-lock disposed between the plurality of cables.

12. The cable assembly in accordance with claim 11, wherein, the clip-lock includes a first-clip and a corresponding second-clip opposed to the first-clip and wherein the first-clip and the corresponding second-clip are configured to engage one another when the retainer is installed onto the cable.

13. The cable assembly in accordance with claim 1, wherein the retainer includes a plurality of terminal position assurance posts (TPA-posts) configured to engage an inner-ferrule disposed within the connector-body, the plurality of TPA-posts extending from a back-side of the retainer parallel to the longitudinal-axis of the cable.

14. The cable assembly in accordance with claim 13, wherein the plurality of tpa-posts pass through passages formed in the cable-seal.

15. The cable assembly in accordance with claim 1, wherein the cable-clamps engage the cable for a length of between 75% to 85% of an outer-diameter dimension of the cable.

16. The cable assembly in accordance with claim 1, wherein the cable-clamps define a contact-surface, wherein the contact-surface is in direct contact with the cable and wherein the contact-surface defines a plurality of grooves extending below the contact-surface, whereby a portion of an outer-jacket of the cable is disposed within the plurality of grooves when the cable-clamps impart radial-force normal to the cable.

\* \* \* \* \*